Feb. 3, 1970   P. G. BHUTA ET AL   3,492,793
LIQUID VAPOR SEPARATOR AND CRYOGENIC LIQUID CONVERTER
Filed Dec. 15, 1967   2 Sheets-Sheet 1

Pravin G. Bhuta
Robert L. Johnson
INVENTORS
BY
*Donald R. Nyhagen*
ATTORNEY.

Pravin G. Bhuta
Robert L. Johnson
INVENTORS 3,492,793
LIQUID VAPOR SEPARATOR AND CRYOGENIC LIQUID CONVERTER
Pravin G. Bhuta, Torrance, and Robert L. Johnson, Marina Del Rey, Calif., assignors to TRW Inc., Redondo Beach, Calif., a corporation of Ohio
Filed Dec. 15, 1967, Ser. No. 690,844
Int. Cl. B01d 53/00
U.S. Cl. 55—159                    5 Claims

ABSTRACT OF THE DISCLOSURE

A liquid-vapor separator and cryogenic liquid converter having an outer hermetic vessel containing an inner hollow porous vapor barrier spaced from the wall of the outer vessel so as to define an intervening inlet chamber, the vapor barrier having an interior outlet chamber and containing capillary pores which are sized to pass liquid but not liquid vapor, whereby vapor entrained in the liquid entering the separator through its inlet, as well as vapor produced by evaporation due to heat transfer through the wall is blocked against passage to the separator outlet thus supplying vapor-free liquid to the liquid outlet. A vapor venting system for the liquid-vapor handling device having an internal venting chamber located in the path of heat transfer to the interior of the storage vessel and communicating with the liquid space in the vessel through a porous liquid permeable vapor barrier to permit venting of vapor phase only.

BACKGROUND OF THE INVENTION

Field of the invention

This invention relates generally to fluid handling devices and, more particularly, to an improved liquid-vapor separator and cryogenic liquid converter. The invention relates also to a novel vapor venting system for liquid handling devices such as the separator and converter.

Prior art

In its broadest aspects, the invention is concerned with liquid vapor separators of the class which comprise an outer hermetic vessel having an inlet and outlet and containing a porous liquid permeable vapor barrier which divides the interior of the outer vessel into an inlet chamber communicating to the inlet and an outlet chamber communicating to the outlet. The vapor barrier is wetted by the liquid in the separator and, when so wetted, permits passage of liquid, but not liquid vapor, from the inlet to the outlet. A separator of this type, therefore, is adapted to contain within its inlet chamber a fluid in both the liquid phase and vapor phase and to provide at the separator outlet a vapor-free liquid. Liquid-vapor separators of this class are well-known in the art. Patent No. 3,286,463, for example, discloses such a separator. The vapor separating or blocking action which occurs in liquid-vapor separators of this kind is well understood and, therefore, need not be explained in detail in this disclosure. Suffice it to say that this vapor blocking action is achieved by utilizing, as the vapor barrier, a porous material such as micronic screen or other suitable porous material having pores which are so sized that the liquid wetting the barrier provides a meniscus interface across each pore which is exposed to the vapor phase within the separator inlet chamber. Each such inner face blocks the passage of vapor through the respective pore so long as the pressure differential across the pore is less than a critical pressure differential related to the surface tension of the liquid and other factors. On the other hand, those pores which are totally submerged in the liquid phase, and thereby exposed to the liquid phase at both sides, contain no such inner face and thus permit the free passage of the liquid phase through the pores under the action of a pressure differential across the barrier.

Liquid vapor separators of the class described may be employed for passive liquid storage and expulsion or for removing vapor entrained in a liquid going through a conduit. In the first mentioned application, the outer hermetic vessel of the separator serves as a liquid storage vessel or tank. Flow of the liquid phase from the separator inlet chamber, through the vapor barrier, to the separator outlet may be induced by the pressure of the vapor phase within the inlet chamber or by a separate pressurizing gas which is introduced into the inlet chamber. In this latter case, the vapor barrier blocks the passage of both the vapor phase and the pressurizing gas.

Liquid vapor separators of the kind under discussion may be utilized to advantage in a wide variety of fluid handling applications. The present invention, however, is primarily concerned with one particular application, to wit, storage and expulsion of cryogenic constituents for life support purposes.

Currently, oxygen and other cryogenic life support constituents for outer space life support purposes are stored in the super critical state. Such super critical storage is dictated by the current state of the art owing to the necessity of overcoming environmental weightlessness in space. However, super critical storage has several major disadvantages. For example, storage in the super critical state requires containment of the life support constituents in large pressure vessels and thus imposes severe weight in volume penalties. Moreover, transfer of a cryogenic constituent from one system to another in the event of an emergency presents a serious problem because of the large pressure drop involved. Thus, this pressure drop may be sufficient to cause line freeze-up due to the Joule-Thompson effect. Such freeze-up would block further gas flow through the system and thus render the latter useless.

Cryogenic fluid storage in the subcritical state avoids the above-noted problem and is otherwise superior to supercritical storage. However, at the current state of the art, subcritical storage is permitted only in an environment in which gravitational forces are dominant. Oxygen for life support in aircraft, for example, is commonly stored in the subcritical state. Among the advantages of subcritical storage are the savings in weight and volume and the increased safety afforded by the lower overall pressure in a subcritical system. Thus, the substantially greater density of a cryogen in its subcritical liquid state reduces the overall size of the storage vessel required to contain a given quantity of the cryogen. Moreover, subcritical storage reduces the pressure vessel requirements and hence mass of the storage vessel. Subcritical storage also permits containment of a mixture of cryogenic life support constituents, such as oxygen and nitrogen, in a single storage vessel and dispensing of the constituents in accurately predetermined proportions. In this regard, it should be noted that supercritical storage of different cryogenic life support constituents requires containment of the constituents in different pressure vessels in order to assure dispensing of the constituents in the proper proportions for human consumption.

Subcritical cryogenic liquid storage for life support purposes, however, does present certain problems which this invention seeks to overcome. One of these problems stems from the fact that an evaporator or heat exchanger is required to convert the cryogenic life support constituents from the liquid phase in which they are stored to the gaseous stage necessary for human consumption.

Such phase transformation must be accomplished in such a way as to insure delivery of the constituents in the gaseous phase at the proper uniform temperature and pressure. This, in turn, requires delivery of the constituents to the heat exchanger in a totally vapor-free liquid phase. Thus, entrainment of a relatively small amount of vapor in the liquid phase entering the heat exchanger may result in the delivery of the gaseous constituents to the point of use at a temperature and pressure which exceeds the optimum or acceptable pressure and temperature levels for human consumption. When multi-gas environments are considered, this requirement is even more important, for the reason that the proportions of different gases are much more easily controlled in the liquid state. With a properly designed heat exchanger, for example, a liquid mixture, such as liquid air, may be completely converted into a gaseous state having the proper proportions of elements for human consumption. As noted earlier, such a multi-component atmosphere is extremely difficult to create and maintain in a supercritical system. Moreover, as will appear presently, the same is true of the existing subcritical systems, which systems are commonly referred to as cryogenic liquid converters.

A cryogenic liquid converter is a device for storing, dispensing, and converting to the gaseous phase liquid cryogens for use in space vehicle life support systems. The liquid phase may undergo direct conversion to the gaseous phase to supply breathing oxygen needs, for example, or the liquid phase may be employed for cooling purposes before its ultimate conversion to the vapor phase. Such life support systems are primarily intended for use during extended space mission under conditions of flow gravity. Thus, a principle problem which must be overcome in such converters involves separation of the liquid and gaseous or vapor phases within the cryogenic Dewar or insulated storage vessel to assure an uninterrupted supply of the desired phase in the specified thermodynamic state and at the specified flow rate.

Several cryogenic liquid conversion system concepts have been proposed in the past to control the orientation of the phases within the cryogenic Dewar so that a given phase may be expelled to the exclusion of the other phases. Among these concepts are:

(1) The use of electric fields to position the liquid phase in a region of high electric field intensity (dielectrophoresis).

(2) Systems of wicks and capillary tube bundles.

(3) Mechanical separation of the liquid and vapor phases by surface tension forces.

(4) Separation of the liquid and vapor phases by a combination of surface tension and magnetic forces based on the paramagnetism of liquid cryogens.

All of these systems suffer from one or more disadvantages. Chief among these disadvantages are complexity, the small forces available for phase orientation, and potential safety hazards. In connection with this latter disadvantage, it is appropriate to point out that a dielectrophoretic system requires high electric fields on the order of $10^3$ volts/meter for phase orientation even in low gravity fields. Moreover, this system requires not only apparatus within the cryogenic storage vessel, but also external high voltage generating apparatus such as a Van DeGraff electrostatic generator which presents a direct safety hazard. Moreover, the possibility of high voltage arcing in an oxygen atmosphere implies an additional enormous safety problem. The existing cryogenic surface tension liquid vapor separators or cryogenic liquid converters, while avoiding the above-noted drawbacks of dielectrophoretic devices, possess certain inherent deficiencies which preclude or limit their use in life support applications. The deficiencies referred to result from the fact that in the existing surface tension devices of this kind, the contained or stored liquid at the downstream or outlet side of the porous surface tension vapor barrier is located in direct heat exchange relation with the wall of the cryogenic storage vessel. As a consequence, environmental heat leak into the vessel through the wall tends to boil the liquid adjacent the wall and thereby produce vapor in the liquid. Since this vapor is produced at the downstream side of the vapor varrier, it may pass without restriction from the separator to the heat exchanger. This creates the pressure and temperature problems referred to earlier. Moreover, when a cryogenic mixture is stored, such as one consisting of oxygen, nitrogen, and/or helium for supplying life support needs, the constituents of the mixture boil off in inverse proportion to their boiling temperatures. As a consequence, it is impossible to accurately control the relative proportions of the constituents present in the final gaseous phase of the mixture. It is for this reason that the existing cryogenic liquid converters for supplying a multi-gas atmosphere require separate storage of the different cryogenic liquid constituents. Such separate storage, of course, is undesirable from the standpoint of overall system weight, size, complexity, and cost.

Another disadvantage of the existing cryogenic liquid vapor separators or cryogenic liquid converters resides in the fact that they lack efficient venting means for regulating the internal system pressure. Thus, the existing devices of this type have no provision for venting only the gaseous or vapor phase from the cryogenic storage vessel or Dewar. Venting of the liquid phase to regulate system pressure is inefficient because of the high density of the liquid phase. Moreover, this venting techniques results in undesirable loss of the cryogenic liquid and substantially reduces the useful operating life of the life support system.

At this point, it is significant to recall that while the invention is disclosed in connection with a cryogenic liquid converter for life support applications, the present liquid vapor separator may be employed to advantage in many other applications and in connection with a variety of fluids, both cryogenic and non-cryogenic, wherein there exists the problems of boiling or vaporizing of the stored liquid in heat exchange relation to the wall of the storage vessel and venting of the vessel to regulate internal system pressure.

SUMMARY OF THE INVENTION

According to one of its aspects, the present invention provides an improved surface tension liquid vapor separator and cryogenic liquid converter, hereinafter referred to simply as a liquid vapor separator, which is uniquely constructed and arranged to avoid the above-noted deficiencies of the existing devices of this type. To this end, the invention provides a liquid vapor separator having an outer container or vessel containing a hollow porous, liquid permeable vapor barrier. This vapor barrier is construtced of micronic screen, sintered bronze, or other suitable porous material which is wetted by the liquid within the separator and which, when so wetted, exhibits a surface tension screening action of the kind referred to earlier. This screening action permits the passage of liquid but blocks the passage of liquid vapor and gas through the capillary pores of the vapor barrier. According to the present invention, the vapor barrier is spaced from the wall of the outer vessel so as to define therebetween an intervening inlet chamber communicating to the separtor inlet. The hollow interior of the vapor barrier defines an outlet chamber communicating to the separator outlet. As a consequence, the liquid contained within the separator which is disposed in direct heat transfer relation to the wall of the outer vessel, that is the liquid within the inlet chamber, is located at the upstream side of the vapor barrier. The vapor barrier is thereby effective to block passage to the separator outlet of not only the vapor and gas which is initially entrained within the liquid supply to the separator through its inlet but also the vapor and gas which is produced by boiling of the liquid adjacent the wall of the outer vessel. The liquid supplied to the separator outlet is thus totally vapor-free.

As will appear from the ensuing description, the present liquid vapor separtor, and particularly its inner porous vapor barrier, may assume various configurations. Accordingly a preferred feature of the invention, however, the vapor barrier is provided with a generally annular shape in transverse section to increase the total effective area of the barrier and, thereby, the full capacity of the separator. According to this feature of the invention, the vapor barrier has a double walled construction including inner and outer porous walls which are spaced to define therebetween the outlet chamber of the separator. The inner porous wall of the barrier defines and surrounds a central chamber which communicates with the separator inlet chamber through communicating passage means. Accordingly, liquid and vapor may circulate freely between the latter chambers, whereby these chambers constitute, in effect, a single inlet chamber having an outer region surrounding and bounded along its inner side by the outer porous wall of the vapor barrier and a central region surrounded and bounded along its outer side by the inner porous wall of the vapor barrier. In the disclosed embodiment of the invention, communication between the outer and central regions of the inlet chamber is afforded by a number of large diameter passages which span the annulus between the inner and outer porous walls of the vapor barrier. These passages are tapered to a decreasing diameter in the direction of their inner ends to facilitate motion of a liquid vapor interphase through a passage in the event it is momentarily plugged by sloshing liquid. During operation of the present liquid vapor separator, therefore, the liquid and vapor phases will exist within both the outer and central regions of the separator inlet chamber, and the liquid phase will pass from both of these regions through the porous walls of the vapor barrier into the outlet chamber within the barrier and then through this chamber to the separator outlet.

Another aspect of the invention is concerned with unique means for venting vapor and gas from a liquid vapor system, such as the present liquid vapor separator and cryogenic liquid converter, to maintain total system pressure within specified limits. According to this aspect, an additional porous, surface tension vapor barrier is placed within the system in such a way as to define a venting chamber located in each heat leak path into the system. The volume of this chamber is made equal to the volume of liquid which, if totally boiled off, would cause the overall system pressure to rise to the maximum permissible level. When the system is initially filled with liquid, the latter passes through the vapor barrier to fill the venting chamber. Subsequent heat leak into the system occurs through the venting chamber and thus tends to vaporize or boil the liquid within the venting chamber. The vapor thus produced in the venting chamber is trapped within this chamber because of the surface tension vapor screening action of the vapor barrier. Leading from the venting chamber is a vent passage containing a valve which is opened when all of the liquid within the venting chamber is boiled away to vent vapor from the chamber and thereby reduce the internal system pressure without loss of liquid from the system. As the vapor is thus vented from the venting chamber, the latter is recharged with liquid by passage of the latter through the vapor barrier into the chamber.

As will appear from the ensuing description, this venting feature of the invention may be employed whether heat leak to the system occurs over a large area, such as over an entire insulated wall or through localized load bearing members. In the first case, the porous vapor barrier defining the venting chamber is placed just inside of and concentric to the insulated wall of the liquid vapor system or storage vessel, such that the venting chamber is co-extensive with this wall. In the second case, in which heat leak occurs through separate load bearing members, a number of porous vapor barriers are placed so as to define separate venting chambers located opposite the load bearing members, respectively, such that each venting chamber situated within the heat leak path through its respective load bearing member.

The disclosed embodiment of the invention is a cryogenic liquid converter for storing oxygen or other cryogens for life support purposes, for space applications, in a subcritical liquid state. The device operates passively using surface tension screens as the porous vapor barriers. The unique configuration of these screens permits the device to draw clear liquid in the presence of boiling adjacent the walls of the storage vessels as well as in a vibration environment such as may be present in space. The vapor-free liquid phase from the converter is circulated through a simple heat exchanger which converts the liquid phase to a gaseous phase prior to its use for life support needs. This disclosed embodiment also employs the above discussed vapor venting feature to permit venting of the gaseous phase, only, should it become necessary to reduce internal system pressure due to unanticipated heat loads. This venting feature adds to the safety and economy of the device in that it permits rapid reduction in system pressure without loss of the liquid phase. A unique advantage of the present converter resides in its capability of storing, in a single storage vessel, a cryogenic mixture, such as a mixture of oxygen and nitrogen for supplying life support needs, and dispensing in precise predetermined proportions the constituents of the mixture.

DESCRIPTION OF THE PREFERRED EMBODIMENTS

Figure 1:
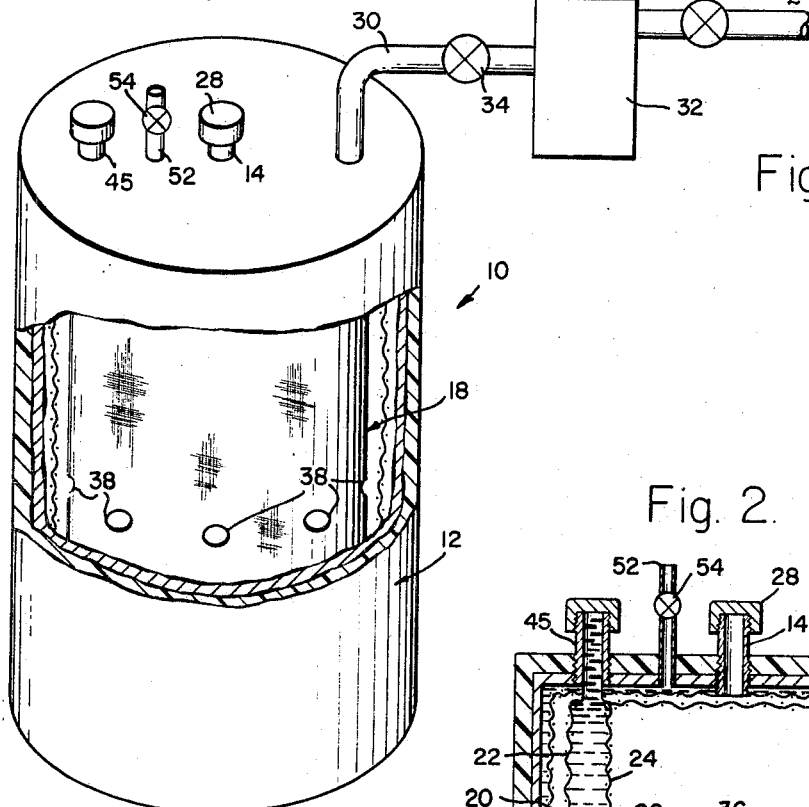
FIG. 1 is a perspective view of a present liquid vapor separator or cryogenic liquid converter with a portion of the outer storage vessel of the separator broken away for the sake of clarity.
Figure 2:
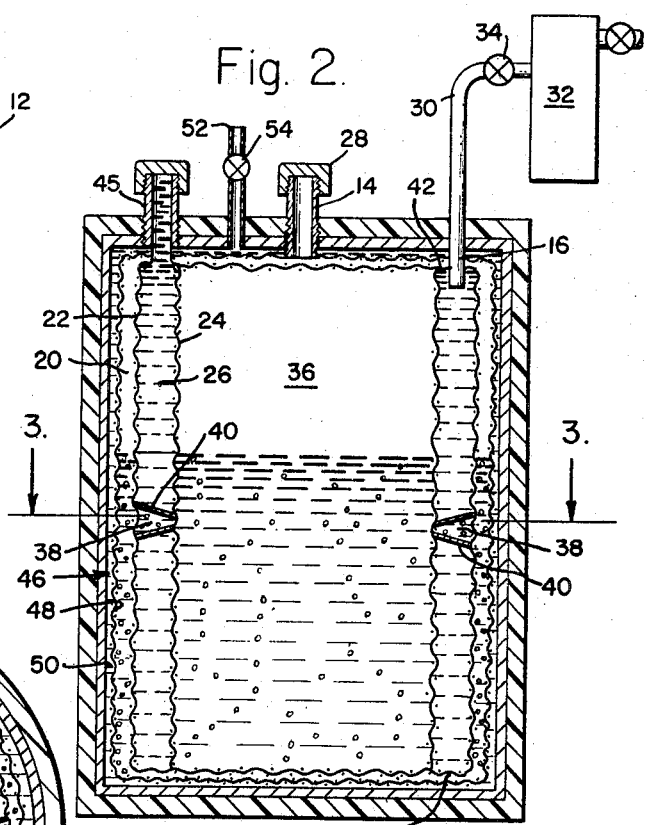
FIG. 2 is a longitudinal section through the separator.
Figure 3:
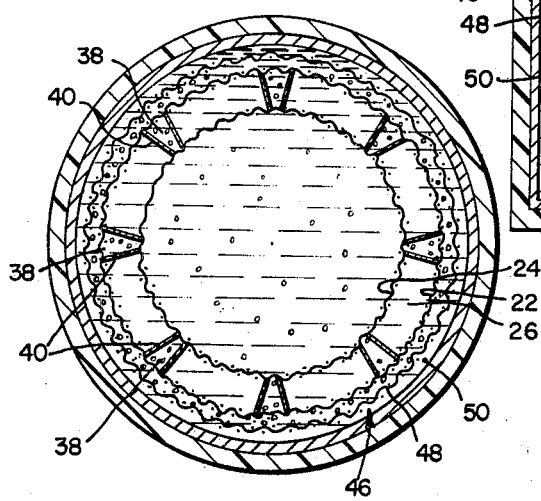
FIG. 3 is a section taken on line 3—3 and FIG. 2.

According to one of its aspects, the invention provides a liquid vapor separator, represented in FIGS. 1 through 3 by the separator 10, having an outer hermetic vessel 12 provided with an inlet 14 and an outlet 16. Positioned within the outer vessel 12, in spaced relation to its wall, is a hollow, vessel-like liquid permeable vapor barrier 18. The outer vessel 12 and the inner vapor varrier 18 define therebetween an intervening inlet chamber 20 which substantially completely surrounds the vapor barrier and communicates to the separator inlet 14. The illustrated vapor barrier 18 has a double walled construction and includes inner and outer porous walls 22, 24 which are spaced to define therebetween an interior outlet chamber 26. This outlet chamber communicates to the separator outlet 16. The vapor barrier 18 is constructed of a porous material which exhibits the earlier described surface tension vapor screening action. In this regard, it will be recalled that various porous materials may be utilized for this purpose including micronic screen, sintered bronze and certain other porous materials. The particular vapor barrier 18 illustrated is constructed of micronic screen.

In use, the liquid vapor separator 18 is supplied with liquid through its inlet 14. This liquid enters the separator inlet chamber 20 and then passes from this chamber to the separator outlet chamber 26 through the porous walls 22, 24 of the vapor barrier 18. The liquid emerges from the outlet chamber through the separator outlet 16. The porous barrier walls are totally wetted by the liquid to condition the vapor barrier for its surface tension vapor screening action, whereby liquid but not vapor or gas may pass freely from the inlet chamber to the outlet chamber. A particularly unique and beneficial feature of the present liquid gas separator resides in the fact that the liquid which is disposed in direct heat transfer relation to the wall of the outer vessel 12, that is the liquid within the inlet chamber 20, is located upstream relative to the direction of liquid flow through the porous walls 22, 24 of the vapor barrier 18. As a consequence, the vapor barrier is effective to block passage, from the separator inlet 14 to the separator outlet 16, of not only gas and vapor which is entrained within the liquid supplied to the separator through its inlet but also any gas or vapor which is evolved by boiling of the liquid adjacent the wall of the outer vessel as a result of environmental heat leak into the separator through this wall. It is now evident, therefore, that any vapor or gas entrained within the entering liquid or evolved by boiling of the liquid adjacent the wall of the outer vessel 12 is trapped within the inlet chamber 20, and the separator draws only clear, totally vapor and gas-free liquid through its outlet 16.

At this point, it is significant to recall that the present liquid vapor separator may be installed in a liquid conduit for the purpose of removing any gas or vapor entrained within the liquid flowing through the conduit, or the separator may be employed as a liquid storage and expulsion device for containing an initial body of liquid and expelling the liquid on demand to a receiver. In the former application, the separator will be connected in the conduit in such a way that liquid enters the separator from the conduit through the separator inlet 14 and returns from the separator to the conduit through the separator outlet 16. In the latter application, the separator will be initially filled with liquid to its inlet 14, after which this inlet will be sealed. The separator outlet 16 will be connected to the liquid receiver. The expulsion pressure for expelling the liquid from the separator to the receiver may be provided by the vapor pressure of the contained liquid or may be furnished by a gas obtained from an external pressurized gas source. In this latter event, it will be understood that the pressurizing gas from the source will be blocked against passage to the separator outlet 16 by the surface tension, vapor screening action of the vapor barrier 18. As will appear from the ensuing description, the liquid vapor separators of the invention which have been selected for presentation in this disclosure are designed for use in this latter application.

Referring now in greater detail to the drawings, the illustrated liquid-vapor separator 10 of the invention is a cryogenic liquid converter for furnishing a breathable mixture to a life support system. In this instance, the outer hermetic vessel 12 of the separator comprises a thermally insulated cryogenic storage tank. The tank inlet 14 is sealed by a closure 28. The tank outlet 16 is connected to the life support system through a conduit 30 containing an evaporator or heat exchanger 32 for converting or transforming to a gaseous phase the liquid phase emerging from the storage tank 12. Conduit 30 also contains a valve 34 for controlling liquid flow from the storage tank to the heat exchanger. As noted earlier, the pressure for expelling the liquid phase from the storage tank 12 to the heat exchanger 32 may be obtained in various ways. In a particular embodiment of the invention which has been selected for illustration, it is assumed that this expulsion pressure is furnished by the vapor pressure of the liquid within the inlet chamber 20 of the cryogenic liquid converter 10. If necessary, an electrical heater may be provided for heating the liquid within the inlet chamber to increase the vapor pressure within this chamber.

The outer storage tank 12 and inner vapor barrier 18 of the cryogenic liquid converter 10 may assume various geometric shapes. In this instance, the storage tank and vapor barrier have generally cylindrical shapes. Because of its cylindrical shape, the vapor barrier 18 defines a central chamber 36 bounded by the inner porous wall 24 of the barrier. Chambers 20 and 36 of the converter are placed in direct communication by passage means 38. Accordingly, liquid and vapor may circulate freely back and forth between these chambers, and the latter chambers constitute, in effect, communicating inlet chambers. The illustrated passage means 38 are furnished by short conduits 40 which extend radially through the vapor barrier 18 at positions spaced circumferentially thereabout and are brazed or otherwise sealed to the porous walls 22, 24 of the barrier. As noted earlier and illustrated in the drawings, each communicating passage 38 is preferably tapered to facilitate motion of a liquid vapor interface through the passage in the event that the passage is momentarily plugged by sloshing liquid. The storage tank inlet 14 opens directly to the outer inlet chamber 20, although the inlet may open to the central inlet chamber 36. The tank outlet 16 extends through and is sealed to the upper annular end wall 42 of the vapor barrier 18. The vapor barrier has a similar lower annular end wall 44. As heretofore mentioned, the illustrated vapor barrier 18 is constructed from micronic screen. A sealed vent 45 opens to the normally upper end of the outlet chamber 26 to permit vapor and gas to be vented from this chamber during initial filling of the storage tank 12 with liquid.

The illustrated cryogenic liquid-vapor separator or cryogenic liquid converter 10 is conditioned for operation by removing the caps from the storage tank inlet 14 and vent 45. The storage tank is then completely filled with cryogenic liquid through the inlet. This liquid initially enters the converter inlet chambers 20, 36 and then passes through the porous walls 22, 24 of the inner vapor barrier 18 into the outlet chamber 26. As the outlet chamber fills with liquid, the latter displaces gas and vapor from the chamber through the storage tank vent 45. The storage tank inlet 14 and vent 45 are then resealed.

When the valves in the converter outlet line 30 are opened the expulsion pressure existing within the converter inlet chambers 20, 36 expells the liquid phase from these chambers through the porous walls 22, 24 of the inner vapor barrier 18 into the outlet chamber 26 and then from this outlet chamber through the converter outlet 16 to the heat exchanger 32. As noted earlier, the expulsion pressure, in this instance, is furnished by the vapor pressure of the liquid phase within the inlet chambers and may be increased, if necessary, by providing electrical heaters for heating the liquid phase within the inlet chambers. The vapor evolved within the inlet chambers is blocked against passage through the vapor barrier walls 22, 24 by virtue of the earlier mentioned surface tension vapor screening action of these walls, whereby only clear, totally vapor and gas-free liquid emerges from the converter outlet 16 to the heat exchanger 32. During its passage through the heat exchanger, the liquid phase is transformed to the gaseous phase at the proper temperature and pressure for human consumption. The gaseous efflux from the heat exchanger flows to the life support system. At this point, it is significant to recall that a particularly unique and beneficial feature of the invention resides from the fact that the stored liquid phase which is disposed in direct heat transfer relation to the wall of the storage tank 12, that the liquid phase within the outer inlet chamber 20, is located at the upstream side of the vapor barrier 18. Accordingly, vapor which is evolved within the inlet chamber 20 as a result of boiling of the liquid phase adjacent the wall of the storage tank by environmental heat tank leak through the wall is blocked against passage to the heat exchanger.

According to another of its important aspects, the invention provides means 46 for venting the gaseous or vapor phase, and this phase only, from the storage tank 12 to reduce internal system pressure should such a need arise due to unanticipated heat loads. In general terms, this venting means comprises a porous vapor barrier 48 which is installed within the storage tank 12 in such a way as to define with the wall of the tank a venting chamber 50 located in the path of heat leak to the interior of the tank. In the particular embodiment of the invention under consideration, the entire insulated wall of the storage tank provides a potential heat leak path. Accordingly, the vapor barrier 48 is located within the tank in such a way that the venting chamber 50 extends about the entire inner surface of the tank wall. To this end, the illustrated vapor barrier 48 has a cylindrical shape of slightly smaller axial and radial dimensions than those of the storage tank 12 and is supported in spaced relation to the tank wall as shown. Communicating with the venting chamber 50 is a vent line 52 containing a vent valve 54 which is normally closed. The vapor barrier 48 may be constructed of the same porous material, i.e., micronic screen, as the inner vapor barrier 18. The outer inlet chamber 20 is located between and is bounded by the inner vapor barrier 18 and the outer vapor barrier 48. The inlet 14 is sealed to the outer vapor barrier 48 and opens to the inlet chamber 20.

When the storage tank 12 is initially filled with liquid in the manner explained earlier, the liquid fills all of the several chambers within the tank, to wit the inlet chambers 20, 36, the outlet chamber 26, and the venting chamber 50. In this regard, it will be evident to those versed in the art that the liquid passes from the inlet chamber 20 to the venting chamber 50 through the outer vapor barrier 48. During this filling operation, the vent valve 54 is opened to permit the liquid which thus enters the venting chamber 50 to displace vapor and gas from this chamber. The vent valve is then reclosed. During subsequent operation of the liquid vapor separator or cryogenic liquid converter 10, any heat leak to the interior of the storage tank 12 occurs through the venting chamber 50 and causes vaporization or boiling of the liquid phase within the chamber. The resulting vapor pressure within the venting chamber displaces the liquid phase from this chamber into the inlet chamber 20 through the outer vapor barrier 48. The evolved gaseous or vapor phase, however, is blocked against passage through the outer vapor barrier because of its surface tension vapor screening action and thus remains trapped within the venting chamber 50. The trapped vapor and gas may be vented from the venting chamber to rapidly reduce internal system pressure when the need arises due to unanticipated heat leak by opening the vent valve 54.

According to the present invention the volume of the venting chamber 50 is made substantially equal to the volume of liquid which, if totally boiled off, will cause the internal system pressure to rise to the maximum permissible level. Thus, the internal system pressure may be rapidly reduced to a safe level when the need arises by opening the vent valve 54. The resulting reduction of the vapor pressure within the venting chamber permits return flow of the liquid phase from the inlet chamber 20 to the venting chamber through the outer vapor barrier 48 to recharge the venting chamber.

Figure 4:
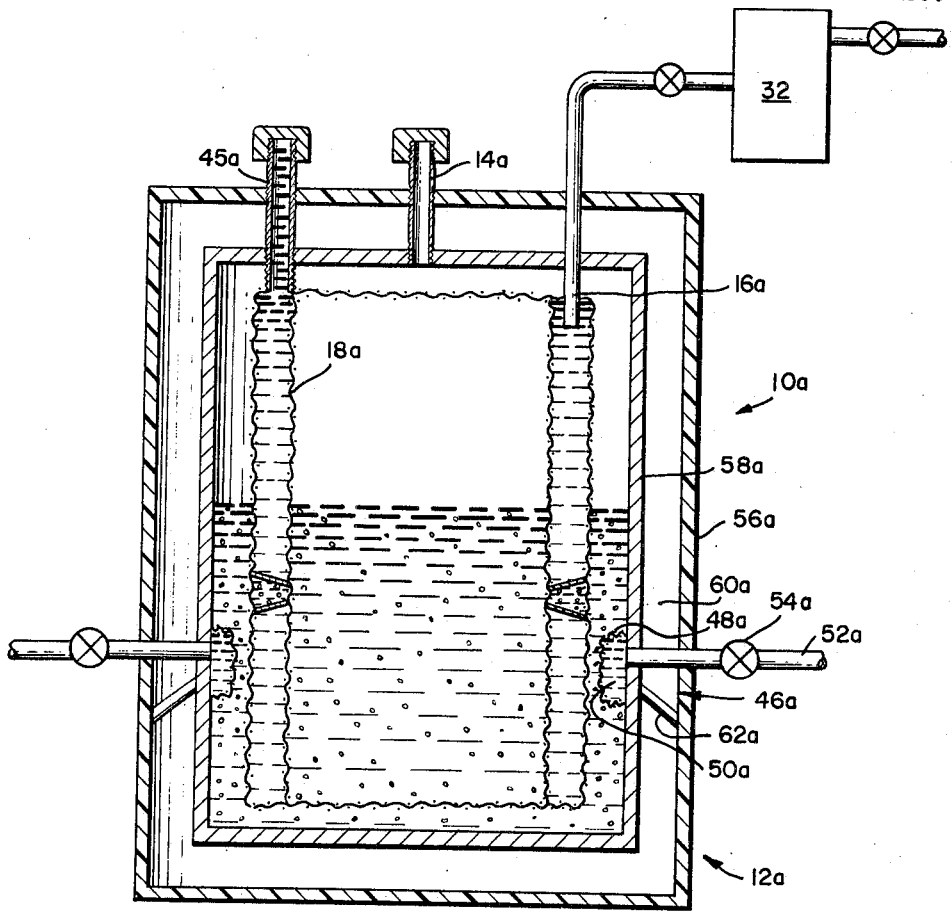
FIG. 4 is a longitudinal section through a modified liquid vapor separator or cryogenic liquid converter according to the invention.

Reference is now made to FIG. 4 illustrating a modified liquid-vapor separator or cryogenic liquid converter 10a according to the invention. This modified converter is identical to the liquid-vapor separator or cryogenic liquid converter just described except for its storage tank 12a and vapor venting means 46a. Accordingly, it is unnecessary to describe the modified cryogenic liquid converter in complete detail. Suffice it to say that the storage tank 12a of the modified converter is a Dewar having spaced outer and inner walls 56a, 58a defining therebetween a thermal insulating space 60a which is evacuated. The inner wall 58a is supported from the outer wall 56a by a number of circumferentially spaced load bearing struts 62a which extend between and are secured to the walls. Each of these struts defines a potential heat leak path to the interior of the Dewar. The venting means 46a of the modified cryogenic liquid converter comprises a number of porous vapor barriers 48a which are sealed to the inner surface of the inner Dewar wall 58a directly opposite the inner ends of the supporting struts 62a, respcetively. Each vapor barrier 48a defines, with the inner wall 58a, a venting chamber 50a. Leading from each venting chamber 50a to the exterior of the Dewar is a vent line 52a containing a vent valve 54a. The modified cryogenic liquid converter 10a is otherwise substantially identical to the earlier described cryogenic liquid converter of the invention except that the porous vapor barrier 48 of the latter converter is omitted and the inlet 14a, outlet 16a, and vent 45a extend between and are sealed to the walls 56a, 58a of the Dewar 12a.

The modified cryogenic liquid converter 10a is filled with liquid in the same manner as the first described cryogenic liquid converter and operates in the same manner as the latter converter to supply clear, totally vapor and gas-free liquid to the heat exchanger 32. In this regard, it will be understood that the inner vapor barrier 18a of the modified converter performs the same surface tension vapor screening action as the inner vapor barrier of the first described embodiment.

The venting means 46a of the cryogenic liquid converter 10a also operates in much the same way as the venting means of the earlier cryogenic liquid converter. In this regard, it is evident that during initial filling the Dewar 12a with liquid, the latter passes through the several vapor barriers 48a, to fill the venting chambers 50a Subsequent heat leak to the interior of the Dewar occurs through the supporting struts 62a and the venting chambers and causes vaporization or boiling of the liquid within these chambers. The resulting vapor pressure within the venting chambers 50a displaces the liquid phase from the chambers through the vapor barrier 48a, while the evolved gaseous or vapor phase remains trapped within the chambers. This gaseous or vapor phase may be vented from the chambers, when necessary to reduce internal system pressure to a safe level, by opening the vent valves 54a. This venting of the chambers 50a permits return flow of liquid back into the chambers to recharge the latter. As in the previous embodiment of the invention, the combined volume of the venting chambers 50a is made substantially equal to the volume of liquid which, if totally boiled off, would cause the internal system pressure to rise to its maximum permissible level. It is now evident that the venting means 46a embodied in the modified cryogenic liquid converter 10a permits rapid reduction of internal system pressure.

At this point, several advantages of the present liquid-vapor separator or cryogenic liquid converter are obvious. One of these advantages, referred to earlier, resides in the fact that vapor produced by boiling of the liquid phase which is disposed in direct heat transfer relation to the wall of the outer storage tank or Dewar, due to heat leak through the wall, as well as gas from an external source for expelling liquid phase from the converter, is blocked against passage to the converter outlet. Another advantage of the invention results from the provision of the vapor venting means 46, 46a which permit rapid reduction of internal system pressure without loss of the liquid phase. These two advantages combine to create a third advantage which resides in the fact that the present cryogenic liquid converter may be utilized to store a mixture of different cryogens for supplying life support needs and dispensing the cryogens in accurately predetermined proportions. This capability, obviously, results from the fact that the cryogens are delivered to the heat exchanger 32 in the liquid phase only.

At this point, attention is directed to the fact that while the vapor vent means of the invention have been disclosed in connection with the present liquid-vapor separator or cryogenic liquid converter, such venting means may be utilized for other purposes. For example, the venting means may be employed in a simple cryogenic liquid storage tank to permit venting of the vapor only from the tank.

While the invention has been disclosed in connection with certain of its physical embodiments, various modifications of the invention are possible within the spirit and scope of the following claims.

What is claimed as new in support of Letter Patents is:

1. A liquid storage device comprising:
   a Dewar vessel having spaced inner and outer walls, load bearing struts extending between and joining said walls, and an interior chamber within and bounded by said inner wall for containing a body of liquid;
   a porous vapor barrier perimetrically sealed to the inner surface of said inner wall opposite each said strut and having its central portion spaced from said inner wall so as to define therebetween an intervening venting chamber;
   the several vapor barriers containing capillary pores which constitute the sole openings through which flow may occur between said venting chambers and any other portion of said interior chamber, whereby vapor and gas evolved within said venting chambers due to boiling of the liquid within said venting chambers by ambient heat leak through said struts remains trapped within said venting chambers; and
   vent means including a valve communicating each said venting chamber to the exterior of said vessel for venting vapor and gas from the respective venting chamber.

2. A liquid-vapor separator comprising:
   a Dewar including spaced inner and outer hermetic vessels and at least one load bearing strut extending between and joined to the walls of said vessels to support the inner vessel in spaced relation to the outer vessel;
   a first inner hollow porous vapor barrier positioned within and spaced from the wall of said inner vessel so as to define between said inner vessel and barrier an intervening inlet chamber substantially completely surrounding said barrier and an interior outlet chamber within said barrier;
   said Dewar having an inlet opening directly to said inlet chamber and an outlet opening directly to said outlet chamber, and said barrier containing capillary pores communicating said chambers whereby liquid entering said separator through said inlet may pass from said inlet chamber through said barrier to said outlet chamber and then through said outlet chamber to said outlet;
   a second porous vapor barrier within and spaced from the wall of said inner vessel opposite said strut so as to define between said latter wall and second barrier a venting chamber;
   said second barrier separating said venting chamber and inlet chamber and containing capillary pores which constitute the sole openings through which flow may occur between said venting chamber and any other interior portion of said inner vessel including any of the chambers through which flow occurs from said inlet to said outlet whereby liquid within said inlet chamber may pass from said inlet chamber through said second barrier to initially fill said venting chamber and vapor and gas evolved within said venting chamber due to heat leak through said strut remains trapped within said venting chamber; and
   vent means including a valve communicating said venting chamber to the exterior of said Dewar for venting vapor and gas from said venting chamber.

3. A liquid vapor separator comprising:
   a hermetic vessel having a liquid inlet and a liquid outlet opening to the exterior of said vessel;
   porous vapor barrier means within said vessel dividing the vessel interior into a number of separate chambers including an inlet chamber opening directly to said inlet and an outlet chamber opening directly to said outlet and containing capillary pores communicating the adjacent chambers, whereby liquid flow from said inlet to said outlet occurs through said chambers and pores;
   a porous vapor barrier member adjacent the wall of said vessel and defining with said wall a venting chamber between and bounded by said wall and barrier member;
   said barrier member containing capillary pores which constitute the sole communicating openings between said venting chamber and the liquid flow path from said inlet through said separate chambers to said outlet, whereby said venting chamber is devoid of any direct communication, other than through the capillary pores of said barrier member, with any portion of said flow path inclding said inlet and outlet, and vapor and gas evolved within said venting chamber due to heat leak through said vessel wall is trapped within said venting chamber; and
   vent means inclding a valve communicating said vent chamber to the exterior of said vessel.

4. A liquid vapor separator according to claim 3, wherein:
   said venting chamber encompasses the entire interior surface of said vessel wall and completely surrounds the remaining interior space of said vessel containing said vapor barrier means and said separate chambers.

5. A liquid vapor separator according to claim 3, wherein:
   said vapor barrier means comprises a hollow vapor barrier, the interior of which defines said outlet chamber, and said inlet chamber completely surrounds said vapor barrier means.

References Cited

UNITED STATES PATENTS

| | | | |
|---|---|---|---|
| 2,986,891 | 6/1961 | McMahon | 62—45 |
| 3,176,882 | 4/1965 | Meermans | 222—187 |
| 3,286,463 | 11/1966 | McGroarty | 60—39.48 |

OTHER REFERENCES

Paynter et al. I, Balzer, Barksdale, Hise, Development of a Capillary System for a Liquid Propellant Orientation During Low-G, Martin Company, Denver Colo., pp. Title, 3, 31 and 32. 1965.

Paynter et al. II, Balzer, Barksdale, Capillary Systems for Storable Propellants, Martin Company, Denver, Colo. 1967. Pp. Title, 4–6, 21, 23 and 33.

REUBEN FRIEDMAN, Primary Examiner

R. W. BURKS, Assistant Examiner